United States Patent
Clark et al.

(10) Patent No.: US 8,397,130 B2
(45) Date of Patent: Mar. 12, 2013

(54) CIRCUITS AND METHODS FOR DETECTION OF SOFT ERRORS IN CACHE MEMORIES

(75) Inventors: Lawrence T. Clark, Phoenix, AZ (US); Dan W. Patterson, Scottsdale, AZ (US); Xiaoyin Yao, Chandler, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 484 days.

(21) Appl. No.: 12/626,479

(22) Filed: Nov. 25, 2009

(65) Prior Publication Data

US 2010/0269018 A1    Oct. 21, 2010

Related U.S. Application Data

(60) Provisional application No. 61/118,364, filed on Nov. 26, 2008, provisional application No. 61/118,360, filed on Nov. 26, 2008, provisional application No. 61/118,337, filed on Nov. 26, 2008, provisional application No. 61/118,351, filed on Nov. 26, 2008.

(51) Int. Cl.
*G11C 29/00* (2006.01)

(52) U.S. Cl. ..................................... 714/763

(58) Field of Classification Search ............. 714/54, 714/709, 763, 718, 724, 49, 48
See application file for complete search history.

(56) References Cited

U.S. PATENT DOCUMENTS

| | | | |
|---|---|---|---|
| 5,347,648 A | 9/1994 | Stamm et al. | |
| 5,870,341 A | 2/1999 | Lin et al. | |
| 5,983,370 A | 11/1999 | Anderson | |
| 6,381,622 B1 | 4/2002 | Lie | |
| 6,701,484 B1 | 3/2004 | Jordan et al. | |
| 6,838,899 B2 | 1/2005 | Plants | |
| 6,901,532 B2 * | 5/2005 | DeRuiter et al. | 714/5.1 |
| 6,901,540 B1 | 5/2005 | Griffith, Jr. et al. | |
| 6,990,010 B1 | 1/2006 | Plants | |
| 7,036,059 B1 | 4/2006 | Carmichael et al. | |
| 7,047,440 B1 | 5/2006 | Freydel et al. | |
| 7,221,607 B1 | 5/2007 | Vernenker et al. | |
| 7,257,763 B1 * | 8/2007 | Srinivasan et al. | 714/764 |
| 8,037,356 B2 | 10/2011 | Rasmussen et al. | |
| 8,112,678 B1 | 2/2012 | Lewis et al. | |
| 8,122,317 B1 | 2/2012 | Clark et al. | |
| 8,301,992 B2 | 10/2012 | Bybell et al. | |
| 2003/0061523 A1 | 3/2003 | Stanley | |
| 2004/0007743 A1 | 1/2004 | Matsuda et al. | |
| 2004/0103267 A1 | 5/2004 | Takata | |
| 2005/0021925 A1 | 1/2005 | Clark et al. | |
| 2005/0024928 A1 | 2/2005 | Cummings et al. | |
| 2006/0153068 A1 | 7/2006 | Dally et al. | |
| 2007/0162798 A1 * | 7/2007 | Das et al. | 714/724 |
| 2007/0260939 A1 | 11/2007 | Kammann et al. | |
| 2008/0250227 A1 | 10/2008 | Linderman | |
| 2009/0006905 A1 | 1/2009 | Luick | |
| 2009/0031163 A1 | 1/2009 | Rashed et al. | |
| 2009/0089642 A1 | 4/2009 | Miles et al. | |
| 2009/0183035 A1 | 7/2009 | Butler et al. | |

OTHER PUBLICATIONS

M. Peng and S. Azgomi, "Content-Addressable memory (CAM) and its network applications," in International IC Taipei Conference Proceedings, Taipei, 2001 [Online]. Available: www.eetasia.com/ARTICLES/2000MAY/2000MAY03_MEM_NTEK_TAC.PDF (Retrieved on May 21, 2012).*

An Area and Power Efficient Radiation Hardened by Design Flip-Flop; Jonathan E. Knudsen, and Lawrence T. Clark; IEE Transactions on Nuclear Science, vol. 53, No. 6, Dec. 2006; pp. 3392-3399.

(Continued)

*Primary Examiner* — Scott Baderman
*Assistant Examiner* — Joseph Kudirka
(74) *Attorney, Agent, or Firm* — Withrow & Terranova, P.L.L.C.

(57) ABSTRACT

Embodiments of circuits and methods for circuits for the detection of soft errors in cache memories are described herein. Other embodiments and related methods and examples are also described herein.

28 Claims, 12 Drawing Sheets

OTHER PUBLICATIONS

Reducing Radiation-Hardened Digital Circuit Power Consumption; John K. McIver III, and Lawrence T. Clark; IEE Transactions on Nuclear Science, vol. 52, No. 6, Dec. 2005; pp. 2503-2509.

A 130-nm RHBD SRAM With High Speed SET and Area Efficient TID Mitigation; Karl C. Mohr, Lawrence T. Clark, and Keith E. Holbert; IEE Transactions on Nuclear Science, vol. 54, No. 6, Dec. 2007; pp. 2092-2099.

Notice of Allowance for U.S. Appl. No. 12/626,488 mailed Nov. 23, 2012, 6 pages.

Non-Final Office Action for U.S. Appl. No. 12/626,488 mailed Apr. 26, 2012.

Non-Final Office Action for U.S. Appl. No. 12/626,495 mailed Aug. 29, 2012.

* cited by examiner

FIG. 2  Data Array Right Half Organization

CIRCUITS AND METHODS FOR DETECTION OF SOFT ERRORS IN CACHE MEMORIES

CROSS REFERENCE TO RELATED APPLICATIONS

This application claims priority to:
U.S. Provisional Patent Application 61/118,364, filed on Nov. 26, 2008;
U.S. Provisional Patent Application 61/118,360, filed on Nov. 26, 2008;
U.S. Provisional Patent Application 61/118,337, filed on Nov. 26, 2008; and
U.S. Provisional Patent Application 61/118,351, filed on Nov. 26, 2008.
The disclosure of each of the applications above is incorporated herein by reference.

GOVERNMENT FUNDING

The disclosure herein was funded with government support under grant number FA-945307-C-0186, awarded by the Air Force Research Laboratory. The United States Government may have certain rights in this application.

TECHNICAL FIELD

This disclosure relates generally to semiconductor memories, and relates more particularly to circuits and methods for detection of soft errors and/or radiation-induced effects in cache memories.

BACKGROUND

Space instrumentation has to operate in hazardous high-radiation environments. Depending on a particular mission this may encompass solar and cosmic radiation as well as trapped high energy electron & proton belts in the vicinity of planetary bodies. The inability to replace hardware failures on satellites means very rigorous instrument design and component selection is needed to ensure reliability during the mission timeline. Semiconductor circuits and devices, including complementary metal-oxide-semiconductor (CMOS) devices are often part of systems and devices used in such harsh environments. Other harsh environments include high altitude flight, nuclear power stations and battlegrounds. However, semiconductors are prone to damage from radiation. This is due to the very nature of semiconductors—typically small band gap materials operating with limited numbers of charge carriers. The effect of radiation in semiconductors is a complicated subject but generally speaking three effects can be identified:
1. Displacement Damage is cumulative long-term non-ionizing damage due to high energy particles. The impact of a high energy particle can create vacancy sites where recombination can occur. This can reduce the device performance and may eventually result in a non operation.
2. Short-term effects, such as Single Event Effects (SEEs) (e.g. a Single Event Upset (SEU) or a single event transient (SET)): this can cause a bit flip (i.e. change in logic state) in an integrated circuit, thereby causing a loss of information. The severity of this effect depends on the type of SEE. In some examples, an SET may propagate through a circuit and lead to an SEU that changes the logic state. Another short-term effect, the dose ray effect, is caused by exposure of an entire integrated circuit to a flood of radiation, such as x-rays. This effect is typically related to short bursts (typically of the order of nanoseconds to milliseconds) of radiation, which can cause temporary, and in some cases permanent, failure of integrated circuits.
3. Total ionization damage where the impact of high energy particles results in electron-hole pair creation. In the case of powered metal-oxide-semiconductor field effect transistors (MOSFETs), electron diffusion can enhance conduction which can lead to permanent turn-on & associated high current consumption (known as 'latch up') resulting in device burn out and potential damage elsewhere. A cumulative measure of the damage is the Total Ionizing Dose (TID). Accumulation of radiation dose can trap charge carriers within semiconductor devices, for example, trapping generated charge in insulating $SiO_2$ regions of a device. This can cause shifts of the threshold voltage, leakage currents, timing skew and lead to permanent, functional failures of the circuit.

Radiation hardening by design (RHBD) employs layout and circuit techniques to mitigate TID and single-event effects, including single-event latchup (SEL). As mentioned above, a primary TID effect is positive charge accumulation in isolation oxides, shifting the threshold voltages of devices associated with the circuit, including parasitic devices. Transistor layouts that provide TID and SEL hardness are typically larger than the conventional two-edge transistors used for non-hardened ICs and increase active power as well as leakage over a non-hardened design. NMOS transistors are usually the most sensitive part of CMOS circuits to total dose effects, and efforts have been made to harden CMOS devices and circuits against total dose effects. Many techniques add further complex processing steps to the manufacturing process. Furthermore, the use of error detection and correction techniques can result in larger circuit sizes and slower performance of semiconductor circuits. Triple redundancy techniques or temporal sampling based design usually result in higher power and/or lower performance (e.g. slow clock rates).

It would be highly advantageous, therefore, to remedy the foregoing and other deficiencies inherent in the prior art.

Figure 1:
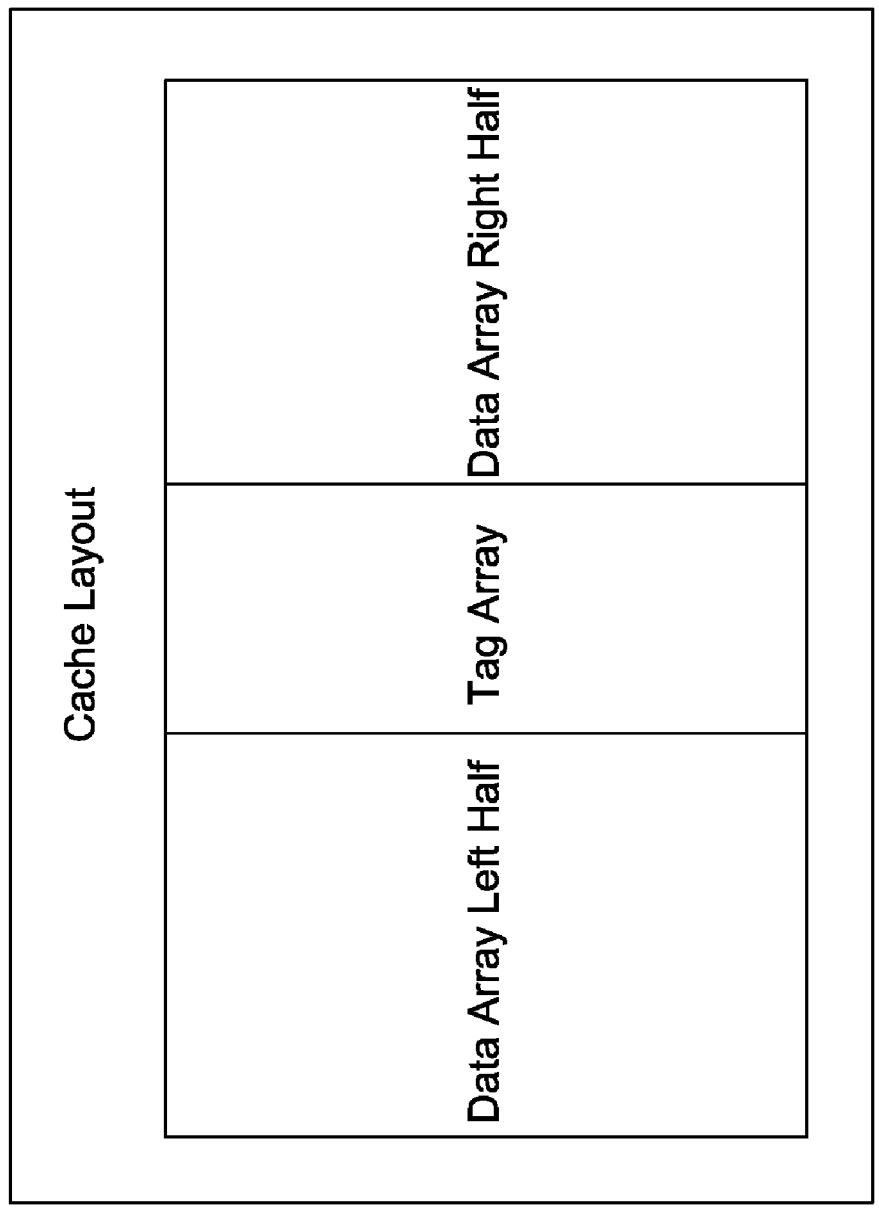
FIG. 1 is a schematic showing cache layout for an exemplary embodiment.

For simplicity and clarity of illustration, the drawing figures illustrate the general manner of construction, and descriptions and details of well known features and techniques may be omitted to avoid unnecessarily obscuring of the drawings. Additionally, elements in the drawing figures are not necessarily drawn to scale. For example, the dimensions of some of the elements in the figures may be exaggerated relative to other elements to help improve understanding of different embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the present disclosure are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in orientations other than those illustrated or otherwise described herein.

The terms "couple," "coupled," "couples," "coupling," and the like should be broadly understood and refer to connecting two or more elements, electrically, mechanically, and/or otherwise, either directly or indirectly through intervening elements. Coupling may be for any length of time, e.g., permanent or semi-permanent or only for an instant. The absence of the word "removably," "removable," and the like near the word "coupled," and the like does not mean that the coupling, etc. in question is or is not removable.

DETAILED DESCRIPTION

Protecting fast microprocessor cache memory from ionizing radiation induced upset is a key issue in the design of microcircuits for spacecraft. However, many microprocessors use write-through caches, whereby a separate copy of all cached data is saved in a higher level cache or in main memory. These larger memories, operating at much lower frequencies, are straightforward to protect by conventional error detection and correction methods. This reduces the fast cache soft error problem to one of error detection, since an upset memory location can be re-fetched into the cache. A soft error is an error occurrence in a computer's memory system that changes an instruction in a program or a data value. Soft errors can occur at the chip-level and at the system level. A chip-level soft error can occur when a charged particle (e.g. caused by ionizing radiation) hits a memory cell and causes the cell to change state to a different value. This does not damage the actual structure of the chip. A system-level soft error can occur when the data being processed is hit with a noise phenomenon, typically when the data is on a data bus. The computer tries to interpret the noise as a data bit, which can cause errors in addressing or processing program code. The bad data bit can even be saved in memory and cause problems at a later time.

The disclosure describes herein a number of techniques to comprehensively detect the soft errors in a fast cache memory. A method of using the generated error signals to maintain cache correctness is to invalidate the entire or affected portion of the cache memory. Additionally, the cache may be periodically invalidated. After such an invalidation operation, the correct values are re-fetched into the cache memory from the (assumed protected) main memory as needed. Many of the error detection techniques are also applicable to detecting errors in generic static random access memory (SRAM) or other integrated circuit memories.

The detailed description that follows is based on two assumptions:
1. When a soft error occurs, it will affect a relatively small region of the chip, causing at most only a few neighboring nodes to flip to an erroneous value. Circuits that must not be corrupted when a neighboring circuit is corrupted are thus spaced sufficiently far apart such that a radiation induced error will affect at most one of the two circuits.
2. When a soft error occurs, it will not be followed by another soft error for many processor clock cycles. This assumption essentially means that when an error occurs, there is sufficient time to recover from the error before another error occurs. Hence multiple bit upsets due to separate ionizing radiation particle strikes is extremely improbable if the machine reacts quickly to detected errors and this detection is comprehensive.

The above assumptions are based on real-world measurements in space based radiation environments, and should even be met in a particle beam from a cyclotron or other such apparatus.

Numerous cache designs are possible with variations on many different parameters. In order to facilitate the description of the soft error detection circuits described here, one particular 16 kbyte 4-way set associative cache is used as the example. The soft error detection circuits described are by no means restricted to this exemplary embodiment. The latter is merely used as an example to help understand the key concepts involved. During cache reads, a 32-bit word is read. During cache writes, data may be written at a byte level of granularity, up to a full 32-bit word. The example cache layout is shown in FIG. 1.

Figure 2:
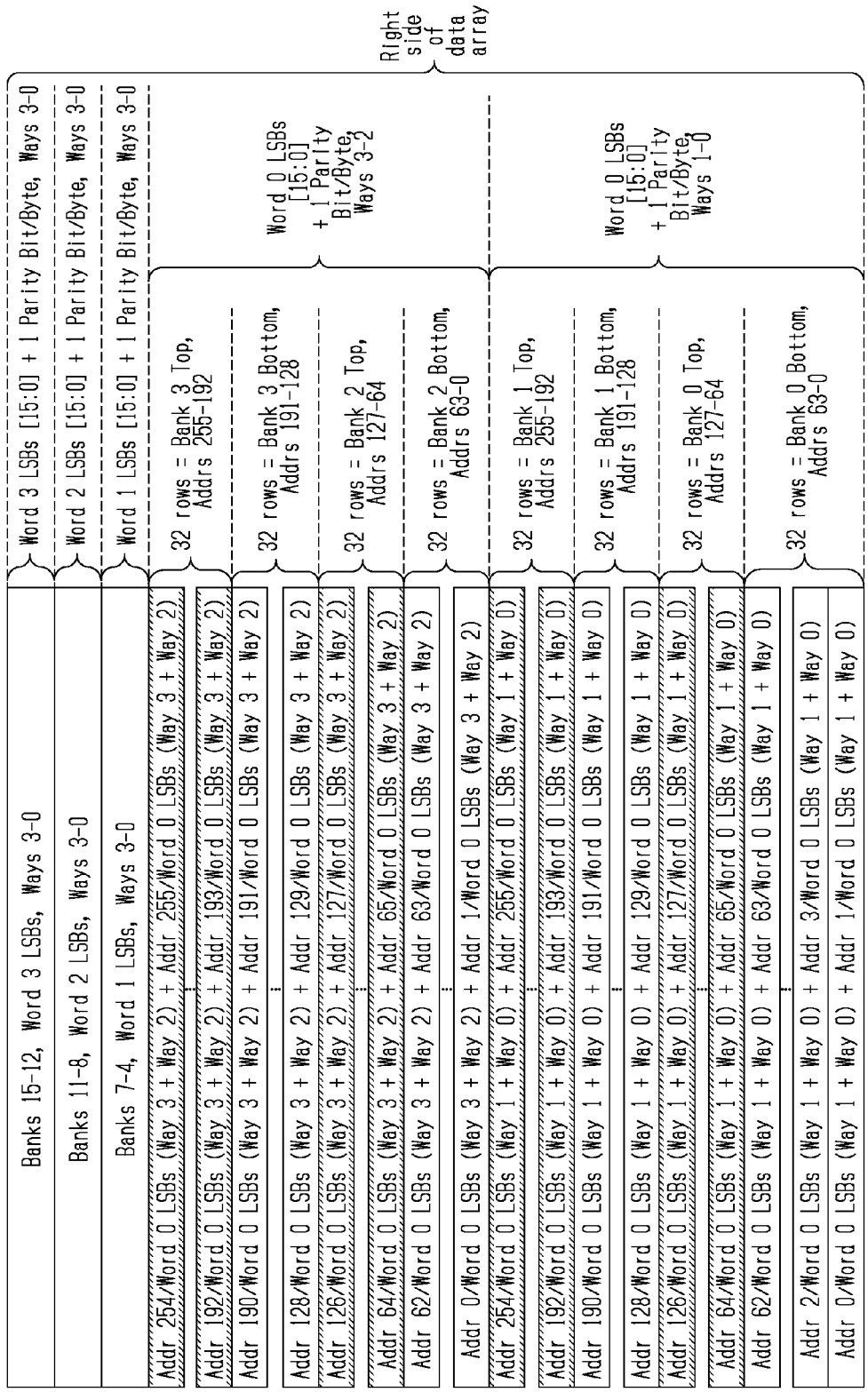
FIG. 2 shows an exemplary data array right side organization.

The most significant 16 bits of each data word are stored in the left half of the data array and the least significant 16 bits of each data word are stored in the right half of the data array. Each byte of data has a corresponding parity bit. The tag array resides between the two halves of the data array. Since the concepts involved in the soft error detection circuits apply to all three arrays shown in FIG. 1, the focus will now be on the right half of the data array in order to describe these circuits. The latter is partitioned into 16 'banks', as shown in FIG. 2.

In this exemplary data array, 16-bit data half-words are accessed in the banks selected by a 2-bit word address. The banks are therefore partitioned into storage space for four 16-bit half-words. Banks 3-0 are used for half-word 0, banks 7-4 are used for half-word 1, banks 11-8 are used for half-word 2, and banks 15-12 are used for half-word 3. Each bank is further partitioned into two "sub-banks", one labeled 'bottom' and one labeled 'top'. Only sub-banks that are accessed in any given cycle are enabled. Each sub-bank contains 32 rows. Two wordlines per row are used to access the random access memory (RAM) cells in the row. The reason for this is discussed further below. There are therefore two sub-bank addresses associated with each row of data, one corresponding to each of the two wordlines. Each sub-bank has its own address decoder responsible for generating these wordlines.

Additionally, data from two of the four ways is available at each of these addresses, either from ways 3-2 or ways 1-0, depending on the sub-bank accessed. Data for ways 1-0 is kept in the lower 2 banks of a half-word partition and data for ways 3-2 is kept in the upper 2 banks of a half-word partition. There are 1024 half-words per half-word partition, yielding a total of 16 KB of data for the entire data cache (not counting parity bits) (256 addresses per half-word partition per 2 ways×2 half-words per address×4 ways×4 half-word partitions per data cache half×2 data cache halves=8192 half-words=16384 bytes).

In order to get a single word output from the cache, the words from each bank must be combined prior to exiting the cache. This must first occur for each of the four ways, and then one of these is ultimately selected as the word to be sent out. This may be accomplished logically through an AND/OR function. In the exemplary embodiment, an AND function is performed between the bitlines of the top and bottom sub-banks to combine the data at the bank level. An AND function is required since the bitlines are precharged to a high state, i.e., only the single bitline that may discharge when its corresponding wordline is asserted can cause the output to toggle. An OR function is then performed between the outputs of the banks for each of the four ways to combine the data across all banks. And finally, a multiplexer is used to select one of the four ways.

The soft error detection circuits exist at the sub-bank and bank levels. Some soft error detection circuits also exist outside the banks, but the concept behind them is the same as for the bank and sub-bank levels, so there is no need to describe these for this example. For example, while the description here focuses on the data array, similar mechanisms are provided to detect soft errors in the tag memory array. The outputs of these circuits are also combined in a similar fashion as for the data described above in order to obtain a single output for each circuit type. However, there are cases where this requires additional checking to ensure that an error does not get masked due to this combining process. This is further described when these circuits are presented.

Multiple design elements must be considered in a cache memory in order to detect the multitude of possible soft errors. In one embodiment, the cache uses a dynamic bitline design whereby bitlines are initially precharged, and subsequently either conditionally discharged during the evaluation phase when cache memory cells are read, or driven by write drivers when the cells are written. The above mentioned design elements can be as follows:

1. RAM cells used to store the cache data
2. Wordlines used to access the above RAM cells for reading and writing, and the address decoders from which the above wordlines are generated
3. Bitlines through which data is read/written from/to the above RAM cells, and associated precharge transistors with their corresponding drivers
4. Data read-out path from the cache memory
5. Write drivers and associated circuitry for writing to the cache memory Soft error detection mechanisms for each of the above design elements are now described.

RAM Cells

The data storage portion of the cache is protected using parity bits. However, parity checking is only effective at detecting single-bit errors. To avoid multiple-bit errors occurring in the same unit of parity-protected data, bits belonging to this data group are physically separated from one another in the cache layout. Since the collected charge from an ionizing radiation particle can affect a very small region of the chip (essentially the ionization track width plus diffusion distance) at most one of these bits should be corrupted when such an error occurs if the physical separation is large enough (there is always a statistical possibility of the particle passing through the IC at an angle that is essentially parallel to the surface of the die, however, sufficient separation makes such an event very unlikely, i.e., allows a large mean-time-to failure (MTTF)).

A cache is typically partitioned into multiple sections referred to as 'banks', where only the required banks are enabled on a cache access in order to minimize power consumption.

One approach to achieving a large physical separation between bits belonging to the same group of parity-protected data would be to put these bits into separate banks This has the drawback of increasing power consumption since more banks have to be enabled per cache access than is the case when the bits belonging to the same group of parity-protected data reside in the same bank. As a result, in one embodiment, all bits belonging to the same group of parity-protected data are located in the same bank. In order to achieve a good data storage density in the cache, this requires bits in the same row to be interleaved with bits belonging to different parity groups. In this fashion, when a soft error occurs, multiple bits may be corrupted, but at most one bit per parity group should be affected. Since a larger spacing between bits belonging to the same group of parity-protected data will result in a lower probability of more than one bit in this group being corrupted by a soft error, multiple bits from other parity protected groups of data should be placed between any two bits belonging to the former group. Therefore, in a single row, adjacent bits must belong to different parity groups and there must be multiple parity groups in order to achieve a sufficient spacing between bits belonging to the same group of parity-protected data.

One way to achieve this is to split the unit of data accessed into multiple parity groups. In the example cache here, the unit of data accessed is a 16-bit half-word per sub-bank, and it has one parity bit per byte of data. As the number of parity bits increases, so does the cache size. To minimize the number of parity bits thus requires bits from multiple units of data accessed to be interleaved. Using this same example, there are 2 parity groups per half-word, one per byte. This allows a spacing of 2 bits to be achieved within this half-word between bits belonging to the same parity-protected byte. However, if two half-words are interleaved within the same row, the spacing may now be doubled. As more half-words are added to the row, the spacing increases. However, as more bits are added to the row, the resistive and capacitive loading of the row's wordline increases, thus limiting the overall number of bits that may reside in the same row due to the decrease in speed and increase in power consumption that results. To overcome this limitation, two wordlines per row are used in the present embodiment. Adjacent bits are interleaved in each row such that one of the bits is accessed by one of the wordlines whereas the other bit is accessed by the other wordline. This also allows sense multiplexing without requiring separate multiplexer enables (see FIG. 4 below).

To summarize with respect to protecting the data storage portion of the cache, parity checking is used to detect soft errors that cause the data in the cache's storage cells to become corrupted. Bits belonging to the same group of parity-protected data (i.e., a byte) are interleaved with bits belonging to other groups of parity-protected data in order to spatially separate the former. This is necessary to prevent soft errors from corrupting more than one bit per group of parity-protected data. The other groups of parity-protected data used in this interleaving scheme come from both the unit of data accessed, i.e., a 16-bit half-word, and other units of data accessed, i.e., other 16-bit half-words. To minimize the overall number of parity bits required, multiple units of data (i.e., 16-bit half-words) are located in the same row to allow more bit interleaving. To minimize the loading on the row's wordline, thus increasing speed and decreasing power consumption, two wordlines are used per row, with alternate bits in each row accessed by each of these wordlines. This is illustrated in FIG. 3.

Figure 3:
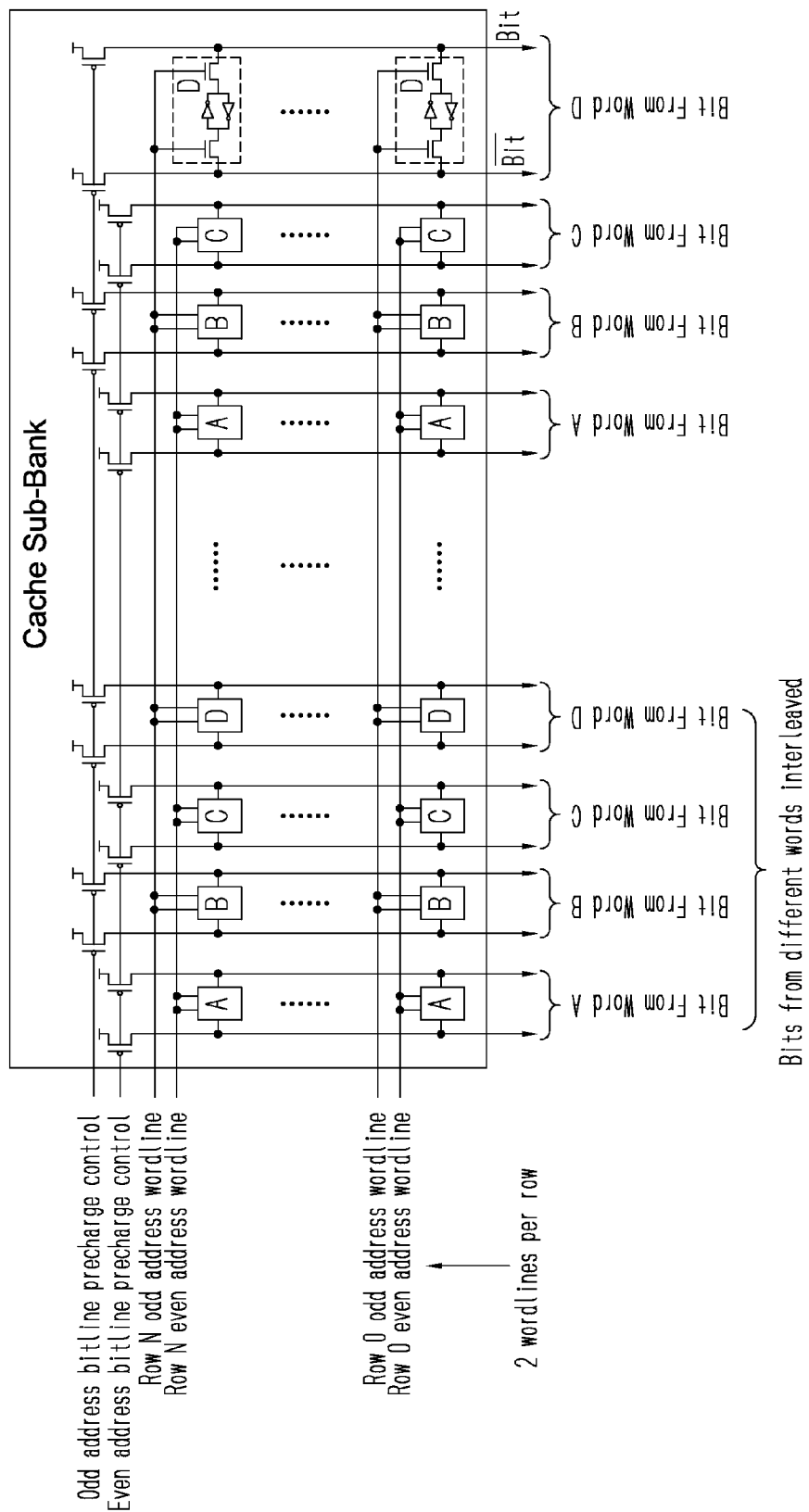
FIG. 3 shows an exemplary cache sub-bank layout.
Figure 4:
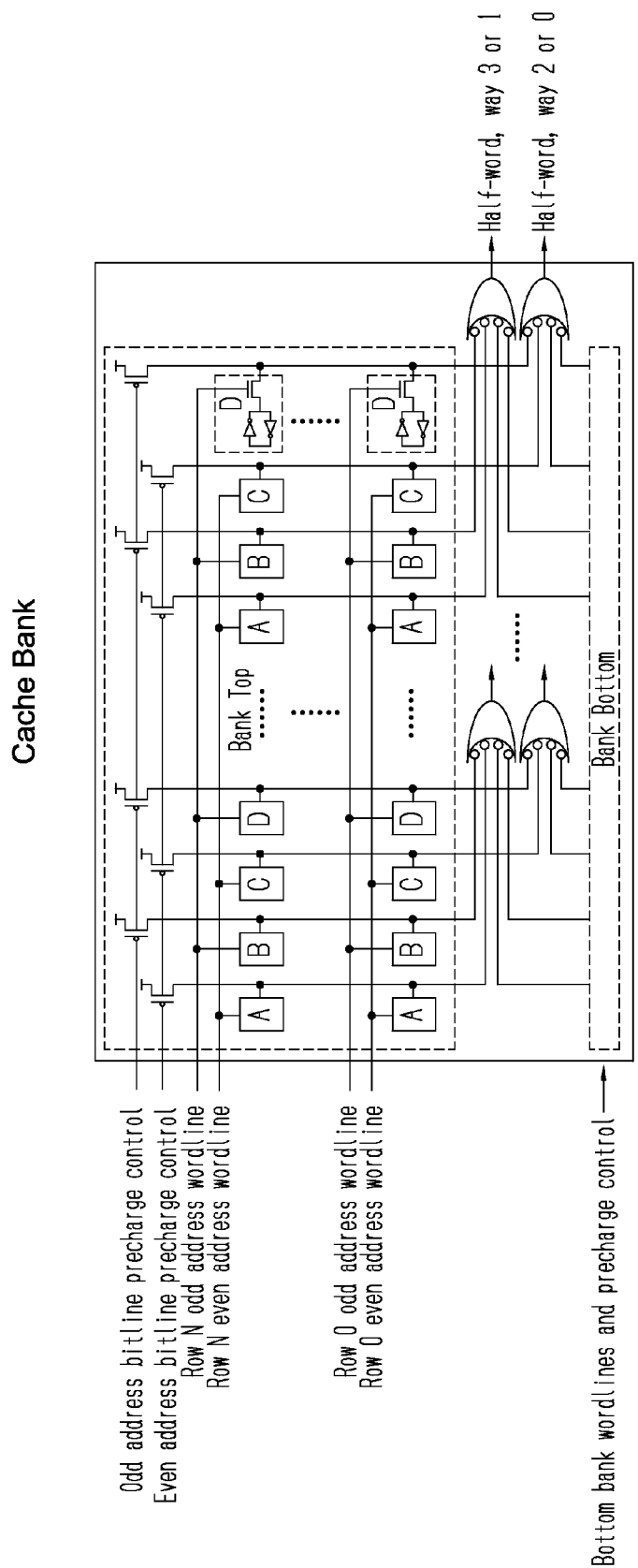
FIG. 4 shows a schematic of an exemplary cache bank layout.

As shown in FIG. 3, two wordlines are used to access each row. One wordline in each row is associated with even sub-bank addresses and the other wordline in each row is associated with odd sub-bank addresses. There are four half-words per row in each bank, along with an additional parity bit per byte (the other half of the word is located in the other half of the data array). These half-words, including their corresponding parity bits, are labeled 'A', 'B', 'C', and 'D'. Half-words 'A' and 'C' are accessed in a row when its corresponding even address is presented, and half-words 'B' and 'D' are accessed in a row when its corresponding odd address is presented. Half-words 'A' and 'B' belong to either way 3 or way 1 whereas half-words 'C' and 'D' belong to either way 2 or way 0, depending on the specific bank. With this layout, no column multiplexing circuits or control signals are required, but multiple columns can share a single sense amplifier as shown in FIG. 4. Each cache bank is such that the bottom and top sub-banks will never be accessed at the same time. This allows the outputs from each sub-bank to be combined as shown in FIG. 4.

Bits belonging to the same parity group are separated from each other by 8 RAM cells in the cache example here. This is achieved by interleaving bits from each of the four words as well as bits from each of the two bytes within each half-word. In this fashion, more than 8 horizontally adjacent cells (vertically adjacent cells of course have different parity bits from each other) would have to be corrupted by charge from a single incident radiation particle induced in order to corrupt more than one bit per parity group.

Figure 5:
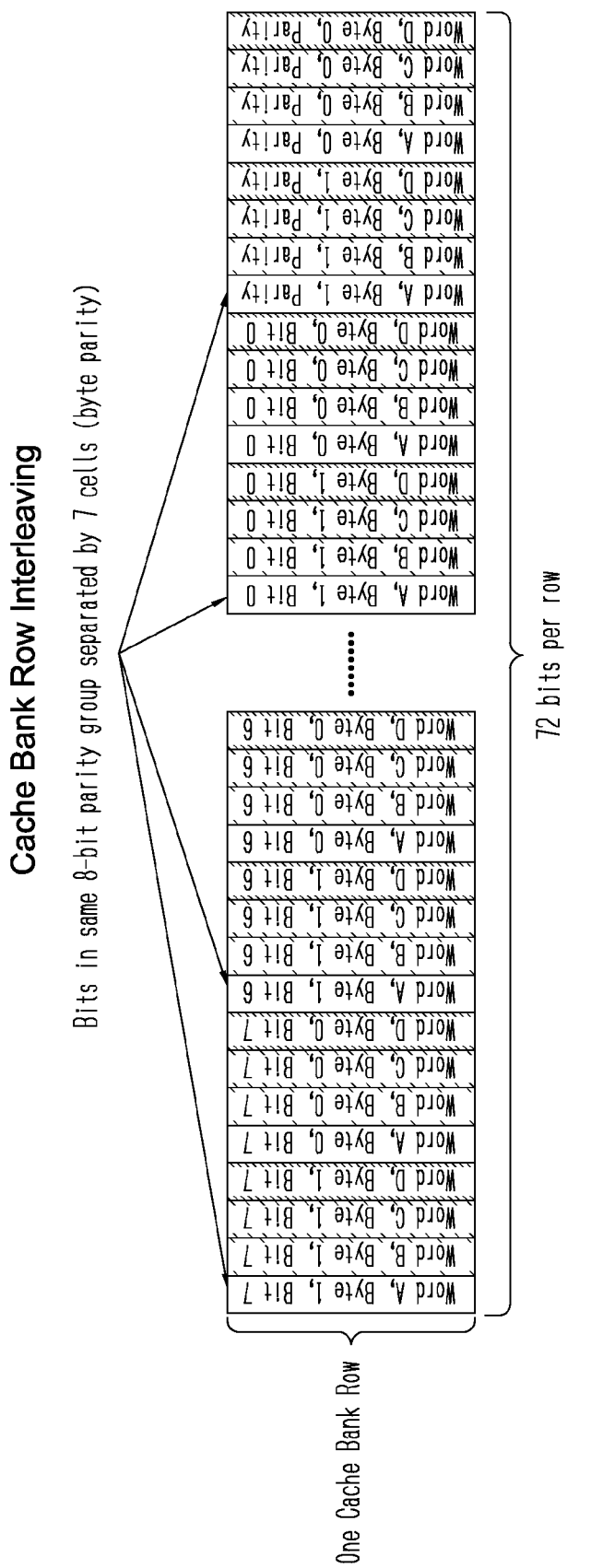
FIG. 5 shows an exemplary cache bank row bit interleaving.

Outputs from all of the banks are further combined externally using a dynamic NOR circuit (not shown here). The actual interleaving used in each row is shown in FIG. 5.

One additional requirement to prevent multiple bits per unit of parity-protected data from corruption due to soft errors is a scrubbing mechanism that periodically either reads all cache locations to detect potential errors, or simply invalidates the cache. This prevents single bit errors from accumulating over time and thereby combining into multiple bit errors in a given unit of parity-protected data. This scrubbing mechanism may either be done using a hardware, i.e., a state machine, or a timed software interrupt (a software routine running on the processor).

Sub-Bank Address Decoders And Wordline Checkers

Figure 6:
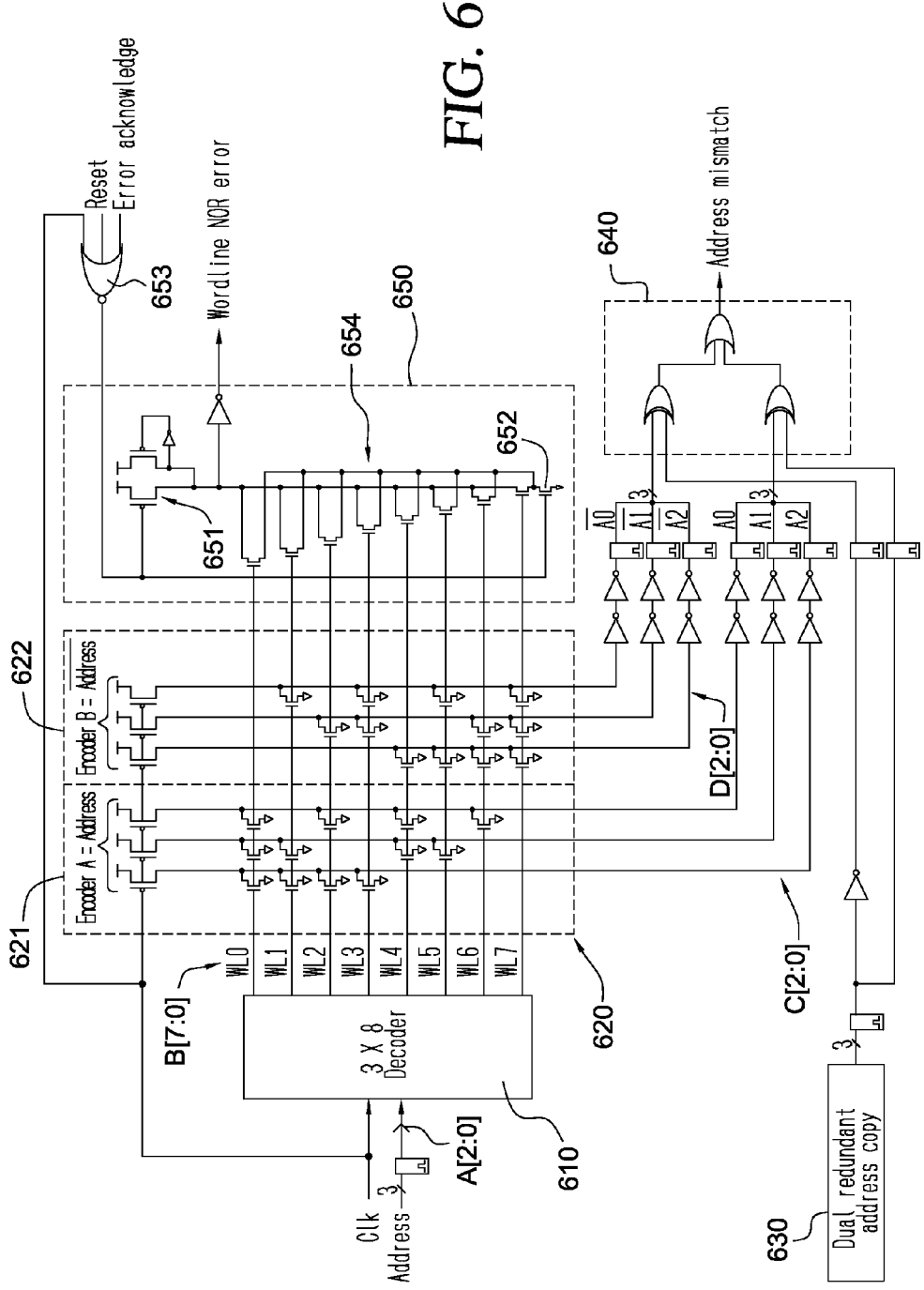
FIG. 6 shows exemplary cache wordline dynamic encoder and NOR gate checker circuits.

As seen in FIG. 6, each sub-bank has its own address decoder 610 and corresponding wordlines, and only sub-banks that are accessed in a given cycle are enabled as mentioned. These must be checked for soft errors both for the case where a wordline is erroneously asserted and the case where it is erroneously de-asserted. Such checker circuits are provided in each sub-bank. During the evaluation phase, the address decoders and wordlines are checked by dynamic wordline encoders 620, such as encoder 621, that re-encode the wordlines and produce an address which is compared to the original address outside the array. In other words, one address bus is decoded by the cache's sub-bank decoders that drive the wordlines which are then re-encoded by the dynamic wordline encoders, while an identical dual redundant address copy 630 is used to compare to the output of the encoders 621. The dual redundant address copy 630 is spaced far enough away from the original address to prevent both from being corrupted by a radiation induced error. This ensures that a radiation induced error that occurs anywhere on the path from address to decoder to wordline will be caught.

In some examples, the output of the dynamic encoders 620 can be combined between sub-banks and banks using an AND/OR scheme just like the one used for the data that is read out. Using this encoding scheme minimizes the number of wires that must be sent out from the cache.

In the present example of FIG. 6, each dynamic wordline encoder 620 actually consists of two encoders: one such as encoder 621 to reconstruct the original address sent to the wordline decoder, and one such as encoder 622 to generate its complement. A single dynamic encoder is not sufficient to detect all wordline errors for the following reason. When an encoded set of bits is decoded, only one output of decoder 610 is asserted. If more than one output is asserted (as would be the case when a SET induced error causes an extra wordline to be asserted), how should one go about re-encoding the decoder's output? Dynamic encoder 620 is precharged so that its output is all logical 1's. When the encoder 620 evaluates, i.e., during the cache evaluation phase when the wordline is driven, the encoder output bitlines that correspond to zeros in the associated encoded address value are discharged. For example, assume a simple 3-bit encoded value A[2:0] that is decoded into 8 outputs B[7:0] which are then re-encoded by a dynamic encoder into outputs C[2:0]. Further assume that A[2:0]=010 resulting in B2 being asserted. When the dynamic encoder evaluates, C2 and C0 will be discharged yielding the correct original value of 010. Now assume that a SET corrupts the output of the decoder such that not only is wordline B2 (correctly) asserted, but B3 (incorrectly) asserts high as well. In this instance, the dynamic encoder will still produce the same result, since the only bit that would normally be discharged for an assertion of B3 would be C2. But since both C2 and C0 were discharged by the assertion of B2, the same encoded value of 010 is produced even though the decoder's output was corrupted. This problem occurs whenever a decoder output is erroneously asserted (in addition to a correct output) but the encoded value that it would normally produce does not result in additional encoder bitlines being discharged relative to the correct value.

To address this case, where multiple decoder outputs or wordlines are asserted concurrently, encoder 622 is used to produce outputs D[2:0] as the complement of the encoded input A[2:0]. The dual redundant address 630 outside the cache and its complement are then compared to their corresponding encoder outputs and if either one mismatches, the error is detected and signaled by wordline mismatch checker 640.

Mathematically, it can be shown that using the encoded address and its complement will always detect an error whenever a wordline is erroneously asserted in addition to a correct wordline. To demonstrate this, consider the following. When address X1 is decoded, it will subsequently be re-encoded into X1 and its complement Y1. When address X2 is decoded, it will subsequently be re-encoded into X2 and its complement Y2. If the wordlines corresponding to X1 and X2 are both asserted simultaneously, the encoder will produce address X=X1 AND X2 and the complement Y=Y1 AND Y2. However, Y1=(NOT X1), and Y2=(NOT X2) (bitwise inversions). Using DeMorgan's theorem, Y=Y1 AND Y2=(NOT X1) AND (NOT X2)=NOT (X1 OR X2). For X=(NOT Y) to be true, this must imply that X1 AND X2=X1 OR X2. The only case for which this holds true is when X1=X2, in which case there is no error. All other error cases will be detected by the fact that X≠(NOT Y). However, another possibility should also be considered. Assume that address X3 is the correct address, but the wordline corresponding to this address is suppressed along with two or more other wordlines being incorrectly asserted. If just one other wordline was incorrectly asserted, we would get an address that does not match X3 and the error would be detected. But is it possible that several other wordlines could be asserted yielding address X3 and its complement Y3? To answer this, assume that two other wordlines are asserted yielding addresses X1 and X2, and their complements Y1 and Y2. The resulting address produced would be X=X1 AND X2 and its complement Y=Y1 AND Y2=NOT (X1 OR X2). Again, for X=(NOT Y) to hold true, we must have X1=X2. Therefore, it is not possible to have two other wordlines erroneously asserted that yield address X3 and its complement Y3. The same argument can be extended to more than two other erroneous wordline assertions, and therefore this approach will detect when any wordline combination other than the correct one occurs.

An example (for illustration purposes) of the dynamic encoders 620 for a 3-bit address is shown in FIG. 6. During the evaluation phase of the cache, the dynamic encoders 620 generate the address and its complement. These are then compared to the dual redundant address 630 and its complement. If a mismatch occurs, an error is flagged by mismatch error checker 640. For the case where a SET induced error corrupts the dual redundant address, a false error is flagged, but this does not result in any sort of malfunction.

FIG. 6 also illustrates an example of a wordline mis-assertion checker 650 that can be used to detect illegal wordline assertions. Wordline mis-assertion checker 650 may be useful in situations where multiple sub-banks are simultaneously accessed using the same address when reading the cache. If a wordline is erroneously asserted, whether in a de-selected sub-bank or in an incorrect clock cycle such as during the precharge phase of the cache, wordline mis-assertion checker 650 will discharge and an error will again be flagged. In the present example, wordline mis-assertion checker 650 comprises a dynamic NOR gate that is initially precharged when the chip is reset. It is also precharged, and thus disabled from evaluating, during the evaluation phase of the cache, since wordline assertions during this time are expected. Finally, when an error is flagged, the NOR gate is precharged again once the error has been observed and acknowledged. This latter precharge mechanism is required in addition to the precharge that occurs during the cache evaluation phase, since this portion of the cache may not be evaluated for quite some time and another error could occur before this, i.e., the impinging radiation particle may upset data bits as well as disrupting the precharge operation—we scrub before another particle can create an uncorrectable error by accumulated hits.

Bitlines And Associated Precharge Transistors With Their Corresponding Drivers

There are essentially two types of SET induced problems that may occur here, one that affects the bitline precharge transistors, and one that affects the precharge transistor drivers.

SETs that affect bitline precharge transistors may occur at various times, resulting in different effects. If a precharge cycle is suppressed, a subsequent read may get the wrong value. If a precharge transistor turns on during a read, the wrong value may be driven out of the array. If a precharge transistor turns on during a write, the wrong value may be written into the array. Regardless of the actual type of error, this will only affect at most one bit per unit of parity-protected data, since the precharge transistors follow the same physical spacing as the RAM cells they are connected to via the bitlines. As a result, the error will be detected when parity is checked during a read. On the other hand, a soft error that affects the precharge transistor drivers, resulting in bitlines being precharged when they're not supposed to be, or vice-versa, will result in more than one bit per unit of parity-protected data being affected. This is due to a precharge transistor driver controlling the precharge transistors for more than one bit per unit of parity-protected data. When a precharge transistor driver is affected by a soft error, this may result in a precharge being suppressed, a precharge occurring during a read, or a precharge occurring during a write. If a precharge is suppressed, it will be detected by the circuit shown in FIG. 7.

If a wordline in one of the multiple sub-banks is erroneously suppressed due to a soft error, this would not be detected by the final encoder output of FIG. 6 since the sub-bank encoder outputs are combined as described above, and the other sub-banks produced the correct address. In other words, the wordline suppression would be masked due to the fact that the other sub-bank encoders produced the correct result and they are combined logically to get the final encoder output. As a result, a separate checking circuit must be used for this case. This circuit can be referred to as a bitline read checker or a bitline preset checker. This is an example of a case where an additional checking circuit is required to ensure that an error does not get masked due to the combining process that takes place between outputs from the banks During the precharge phase, the wordlines are checked by a dynamic NOR gate that checks for illegal wordline assertions.

Figure 7:
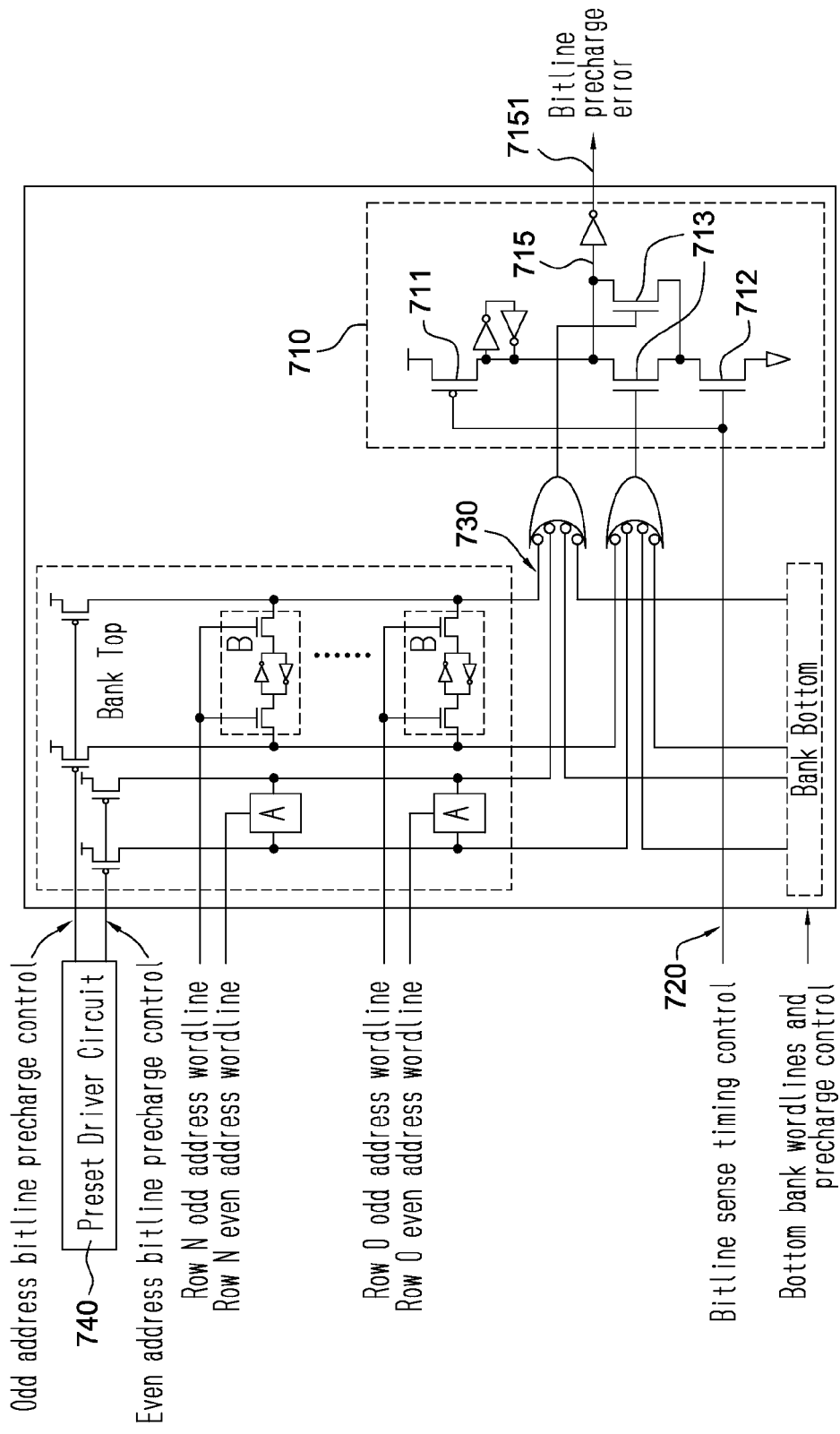
FIG. 7 shows an exemplary bitline precharge suppression detection circuit.

An example for a bitline preset checker 710 is shown in FIG. 7, where only two of the data bit columns are checked in the present example to minimize the area overhead, but this is sufficient to detect when the precharge has been suppressed on any of the bitlines due to a soft error on the bitline precharge drivers. The above bitline preset checker 710 has a bitline sense timing control signal 720. When the bitline sense timing control signal 720 is de-asserted, gate 711 presets bitline preset checker 710 so that the bitline precharge error signal 7151 is de-asserted. After bitlines 730 should have been set to a preset condition by preset driver circuit 740, control signal 720 is asserted to actuate gate 712. In the present embodiment, the preset condition comprises a charged condition, such that bitlines 730 are precharged. Other embodiments where bitlines 730 are discharged to set the preset condition are also possible. If bitlines 730 were indeed correctly precharged, error signal 7151 output will remain de-asserted. If one of the bitlines was not correctly precharged, one of bitline switches 713 will be enabled by one of bitlines 730, such that error signal node 715 will discharge via gate 712 and such that error signal 7151 will be asserted.

Figure 8:
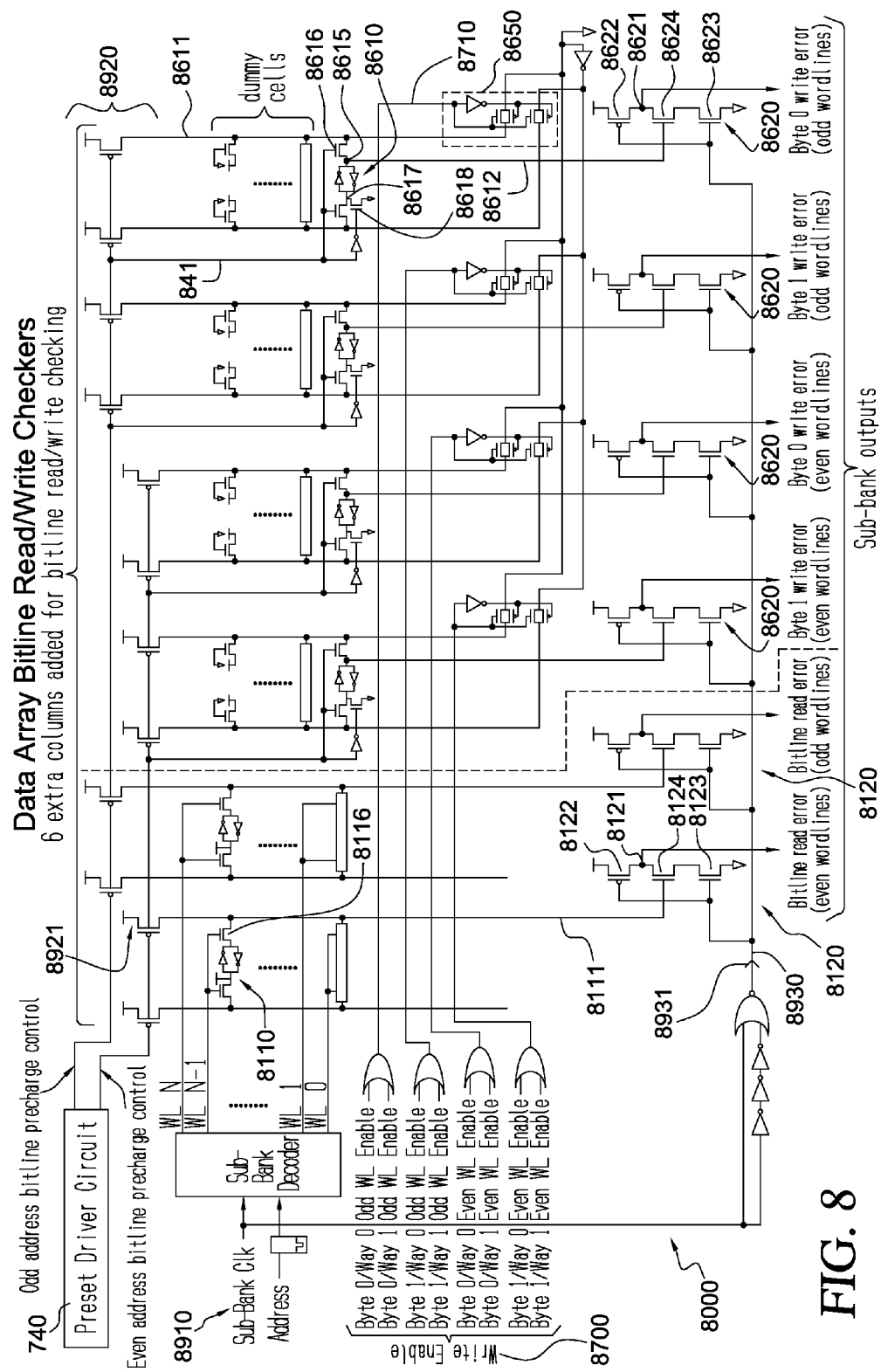
FIG. 8 shows exemplary bitline read and write checkers.

If an erroneous bitline preset occurs during either a read or a write, one of the circuits shown in FIG. 8 will detect the soft error.

In each data array sub-bank of the present exemplary memory array 8000, 6 additional columns are added with the checking circuits shown in FIG. 8. The two leftmost columns in FIG. 8 are used for checking read cycles and the remaining four columns are used for checking write cycles. Bitlines for the columns are preset by preset driver circuit 740 via preset transistors 8920. The columns associated with read cycles have check cells 8110 that are hard-wired to a fixed value and are configured to set one of check bitlines 8111 to a de-asserted condition when an associated one of check cells 8110 is addressed. The columns associated with write cycles each have a single memory check cell 8610 that may be written and read, and the remaining "dummy cells" are simply used to obtain similar loading on the bitlines as would be seen on regular bitlines not used for checking The memory check cell 8610 in each column associated with write cycles is written with a logic '1' during the preset phase, and is written with a logic '0' during the write phase. Read and write cycles happen when the clock 8910 is asserted. When the clock 8910 clock is de-asserted, a short pulse 8931 is used to enable a sampling window for the dynamic circuits that perform the checking. In the present example, such dynamic circuits comprise bitline read error checkers 8120 and bitline write error checkers 8620.

The point of the circuits shown above is to check that the bitlines have fully developed by a certain point in time during the evaluation window of a read, and that a RAM cell has been correctly written by a certain point in time during a write. In this case, the time in question is when the sub-bank clock transitions from a HI to a LO; i.e., is de-asserted. However, this may be skewed slightly depending on the actual cache timings. The desired sampling window for checking bitline error checkers 8120 and 8620 should be sufficiently after the bitlines have developed or the cell has been written, and sufficiently before the bitlines are precharged to ensure that the circuits don't flag false errors. The sampling window lies somewhere near the HI-to-LO transition of the clock in the present example, and necessitates the narrow sampling pulse.

By the time the sampling window is enabled by pulse 8931 for a read cycle, check bitlines 8111 for the column accessed (i.e., even vs. odd address) should have evaluated and one of the differential pair of bitlines should have discharged. This will have the effect of preventing the dynamic checker circuit from discharging, thus indicating that no error was detected. On the other hand, if the precharge transistors for the column accessed are turned on at this time, neither column will discharge (since the precharge transistor has much more drive strength than a RAM cell), and an error will be flagged. This circuit also detects when a wordline is suppressed due to a soft error and was mentioned in the previous section. It is required for this purpose since the combining of the sub-bank dynamic wordline encoder outputs will result in this type of error being masked when checking the encoded address output.

Focusing on the leftmost column of FIG. 8, the bitline read error checker 8120 can be described as follows. The memory circuit comprises preset driver circuit 740 configured to set check bitlines 8111 to a preset condition, where the preset condition comprises a precharged condition in the present example but could comprise a discharged condition in others. Check bitlines 8111 are coupled to and controlled by preset driver circuit 740, and check cells 8110 are coupled to associated ones of check bitlines 8111 and are configured to set check bitlines 8111 to an unset condition when an associated one of check cells 8110 is addressed by wordline WL N-1 in the present example. Check-cells 8110 can comprise a fixed value, being hardwired to a power node in the present embodiment, and can set an associated one of check bitlines 8111 to the unset condition when addressed if associated ones of preset switches 8921 are disabled. The unset condition comprises a discharged condition in the present example, but could comprise a charged condition in others. Bitline read error checkers 8120 are coupled to associated ones of check bitlines 8111, and are configured to detect and signal a soft error when check bitlines 8111 are in the preset condition during the sampling window for the read cycle. Bitline read error checkers 8120 comprise error signal node 8121, precharge gate 8122 configured to precharge error signal node 8121, and discharge gate 8123 configured to permit a discharge of error signal node 8121 during the sampling window.

A clocked control line 8930, configured to carry pulse 8931, is configured to inversely actuate precharge gate 8122 and discharge gate 8123 relative to each other, and to actuate discharge gate 8123 during the sampling window. Each bitline switch 8124 is controlled by a different one of check bitlines 8111, and is coupled between precharge gate 8122 and discharge gate 8123. In the present example, when bitline switch 8124 is enabled by the associated one of check bitlines 8111 while discharge gate 8123 is enabled by clocked control line 8930, error signal node 8121 is discharged to signal a bitline read error.

Figure 11:
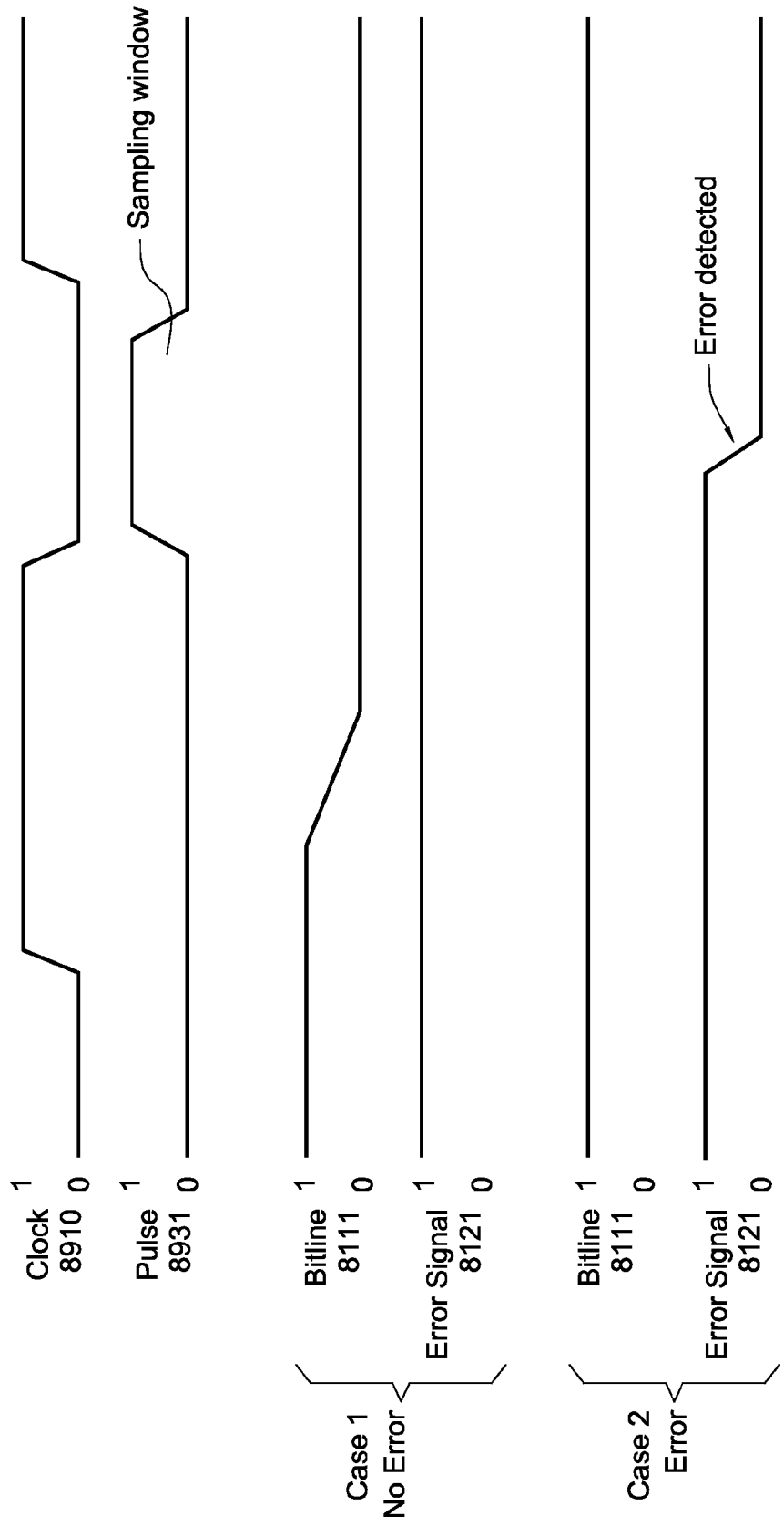
FIG. 11 shows exemplary byte write enable checkers.

As seen in the timing diagram of FIG. 11, pulse 8931 is asserted at the falling edge of clock 8910. Inverters provide a delayed clock, which de-asserts clocked control line 8930. A different number of inverters can be used in other examples. The delay creates the sampling window, for checking error signal node 8121 of read error checker 8120, by asserting the gate of discharge gate 8123. If discharge gate 8123 and bitline switch 8124 are on simultaneously, signal NOT(bitline_read_error) is asserted low, indicating an error. Signal NOT(bitline_read_error) must be latched at the rising clock edge, when precharge gate 8123 will precharge error signal node 8121 for the check in the next cycle. Case 1 in FIG. 11 illustrates an instance where the timing is accurate, because the relevant one of check bitlines 8111 is discharged via access transistor 8116 of one of check cells 8110 when wordline WL_N-1 is asserted prior to the sampling window. Case 2 in FIG. 11 illustrates an instance where the timing was not accurate. Here, wordline WL_N-1 was not timely asserted to discharge the relevant one of check bitlines 8111 by the sampling window, such that error signal node 8121 is thus actuated to signal the bitline read error. Although in the present embodiment error signal node 8121 generates signal NOT(bitline_read_error) in negative logic, there can be other configurations that generate a corresponding bitline_read_error signal in positive logic.

Read error checkers 8120 can also be used to check for wordline timing errors which the wordline encoder of FIG. 6 may not detect. If the trailing edge of a wordline is pulled in (the wordline de-asserts early) due to a SET, it's possible that the wordline encoders 620 will produce the correct encoded address and its complement, whereas the cells accessed in the main array may not be read out correctly, due to insufficient bitline development in the main array on some or all of the bits.

For write cycles, the memory check cell for the four rightmost columns in FIG. 8 should have been written when the checker circuits evaluate during the sampling window. If the write executes correctly, the checker circuits will not flag an error. If the write did not execute correctly for a given memory check cell, the corresponding checker circuit will discharge, thus flagging an error. Focusing on the rightmost column of FIG. 8, check bitline 8611 is controlled by preset control line 841 via a preset transistor 8920. Still focusing on the rightmost column in FIG. 8, memory check cell 8610 comprises check node 8615 and is coupled to check bitline 8611 and to preset control line 841. Preset control line 841 is configured to write memory check cell 8610 to thereby set check node 8615 to a logic value correlated to a logic value of preset control line 841. As an example, preset control line 841 is set to a logic "1" during a preset phase for the write operation, and correspondingly sets check node 8615 to a logic "1" during the preset phase. In the present embodiment, preset control line 841 is coupled to an inverter, which is coupled to a control terminal of write switch 8618. Write switch 8618 controls access to write node 8617, which is complementary to check node 8615. Data bitline 8612 is coupled directly to check node 8615, thus bypassing access transistor 8616 to directly access the memory of memory check cell 8610. Still focusing on the rightmost column in FIG. 8, bitline write error checker 8620 is coupled to data bitline 8612 and is configured to detect a soft error when data bitline 8612 is in the preset condition during the sampling window for the write cycle. Bitline write error checker 8620 comprises error signal node 8621, precharge gate 8622 configured to precharge error signal node 8621, and discharge gate 8623 configured to permit a discharge of error signal node 8621. Clocked control line 8930 is coupled to clock 8910, and is configured to inversely actuate precharge and discharge gates 8622 and 8623 relative to each other, and to actuate discharge gate 8623 during the sampling window. Bitline switch 8624 is controlled by check node 8615 via data bitline 8612, and is coupled between precharge and discharge gates 8622 and 8623. When bitline switch 8624 is enabled by check node 8615 while discharge gate 8623 is enabled by clocked control line 8930 during the sampling window, error signal node 8621 can be discharged to signal a bitline write error.

In the cache described for FIG. 8, individual bytes may be written. Since there are 2 bytes per half-word, 2 ways per row that may be written, and a choice of either even or odd address bytes in the same row, this requires 8 byte enable signals, or write enable signals 8700, to enable writes. Write enable signals 8700 are used in the checking circuits to determine which memory check cells 8610 cells should be written.

As an example, the present embodiment comprises write enable line 8710 configured to actuate cell write circuit 8650 for writing memory check cell 8610 after the preset phase. When the check bitline 8611 is set to the unset condition by cell write circuit 8650 while access switch 8616 is enabled by preset control line 841, memory check cell 8610 is written by check bitline 8611 to set data bitline 8612 to the unset condition and to disable bitline switch 8624 of bitline write error checker 8620.

Bitline write error checkers 8620 can also be used to check write enable signal timing errors which the write enable checker (discussed further below for FIG. 10) may not detect. For example, if the trailing edge of the write enable is pulled in (the write enable de-asserts early) due to a SET, it's possible that the write enable checker will produce the correct output while the cells accessed in the main array may not be written correctly.

Note that for both reads and writes, the outputs of bitline error checkers 8120 and 8620 must be qualified based on the access that took place. For example, the checker column associated with reads for odd addresses will always signal an error when an even address is presented, the write checkers will always signal an error during reads, etc.

Figure 9:
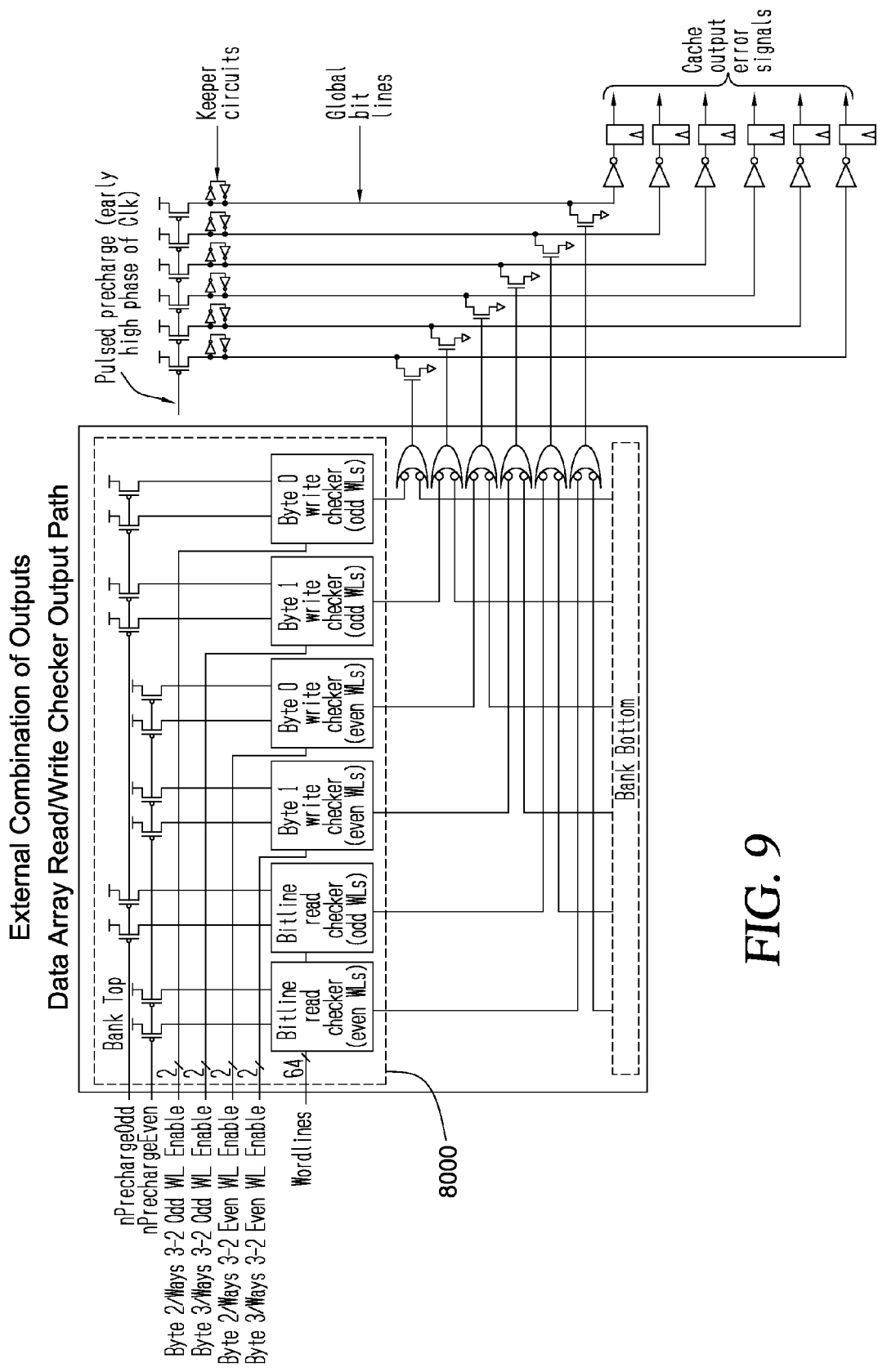
FIG. 9 shows exemplary external "global bitlines" combining an error status of different sub-banks of the data array.

As mentioned above, a short pulse is used to enable the checker circuits in FIG. 8. However, as soon as that pulse disappears, the output of the checkers will be precharged and any error status that may have been indicated at that time will be lost. In the example embodiment, this is handled as shown in FIG. 9. Since the error status of two sub-banks must be combined, and these must be further combined with the error status from other banks, external dynamic "global bitlines" are used for this combining process. In the early part of the high phase of the clock, these bitlines are precharged. The checker circuits are subsequently enabled on the high to low transition of the clock, and if an error is detected, it will result in its corresponding global bitline being discharged. The checker circuit may then be precharged since the error status will now correctly be shown on the global bitline when it is sampled on the subsequent rising edge of the clock.

Data Read-Out Path From The Cache Memory

The outputs from the cache banks are combined externally to obtain a final cache output. Throughout this path, all transistors are spaced such that a soft error may not corrupt more than one bit per unit of parity-protected data. As a result, any soft errors that occur as data is being read out of the cache will be caught by parity checking circuits.

Write Drivers And Associated Circuitry For Writing To The Cache Memory

Figure 10:
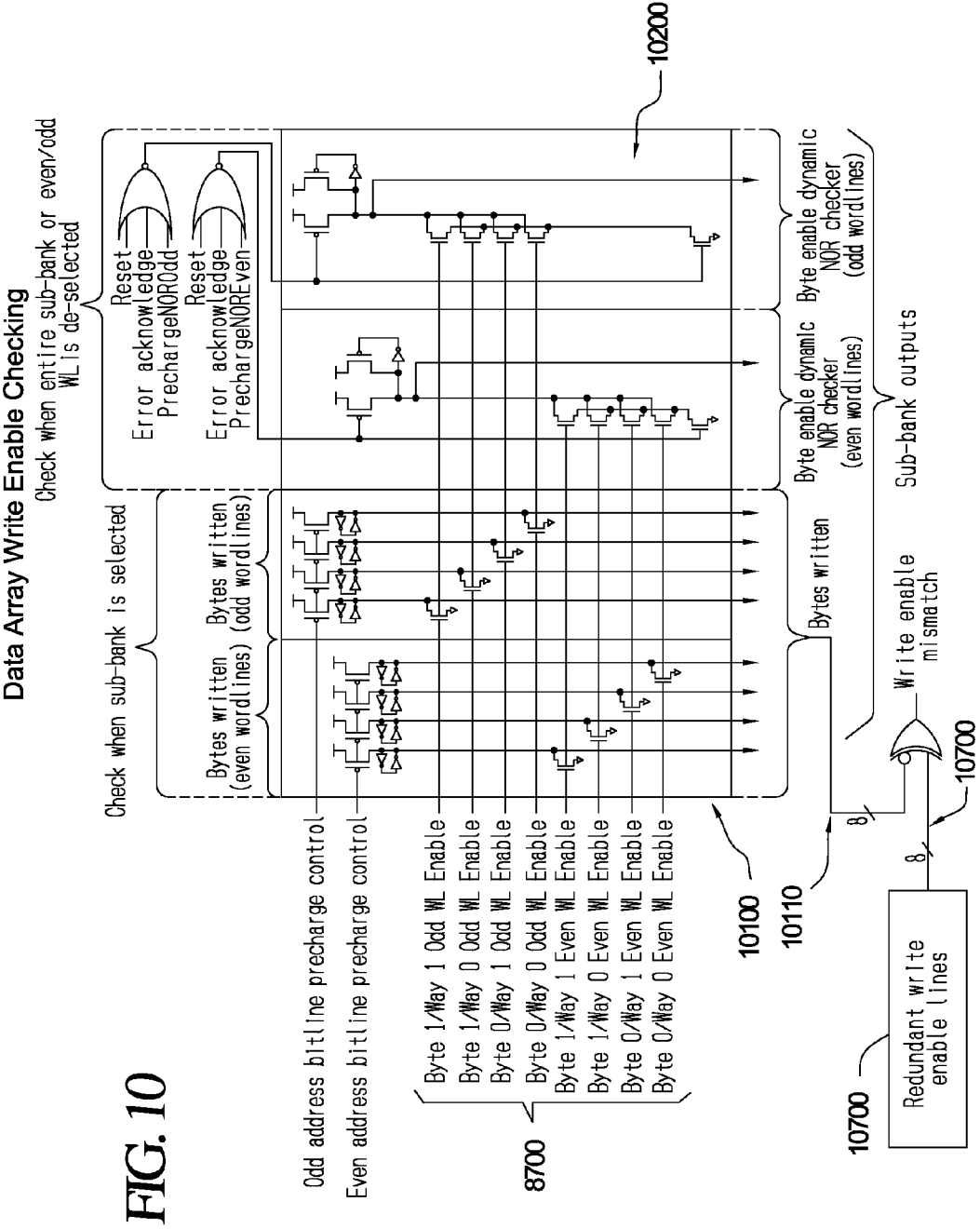
FIG. 10 shows an exemplary timing diagram for the exemplary bitline read and write checkers of FIG. 8.

Circuits similar to those used to check for wordline errors in FIG. 6 can be used to check for errors on the data byte enable signals such as write enable signals 8700. This is shown in FIG. 10.

Instead of using encoders, each sub-bank comprises a write enable assertion detector 10100 that detects and indicates which write enable signals 8700 were asserted. These sub-bank outputs are combined inside each bank into write enable check bus 10110, and then externally between banks When a write to the cache occurs, dual redundant write enables 10700 external to the cache will be compared with the corresponding write enable check bus 10100 to verify that the write enable signals 8700 were not corrupted by a soft error. Similar to the case where a wordline is suppressed due to a soft error but the error is masked due to the way that the encoder outputs are combined, the same situation may occur with the write enables when a full cache line is written to the cache and more than one word is written. If a write enable 8700 is suppressed and the error is masked, it will still be caught by the bitline write checker circuits. FIG. 10 also illustrates write enable mis-assertion checker 10200, which is similar to wordline mis-assertion checker 650 (FIG. 6).

With respect to the write drivers for the actual data written to the cache memory, a dual redundant data path with appropriate spatial separation exists up to a certain point outside of the cache. Dual redundant checking is used there to detect radiation induced mismatches. Beyond this point all the way to the RAM cells that are written inside the array, appropriate spacing is maintained between bits belonging to the same parity group to ensure that a radiation induced error will affect at most one bit per parity group. This type of error will not be detected until a subsequent read of the cells in question when parity checking is performed.

Figure 12:
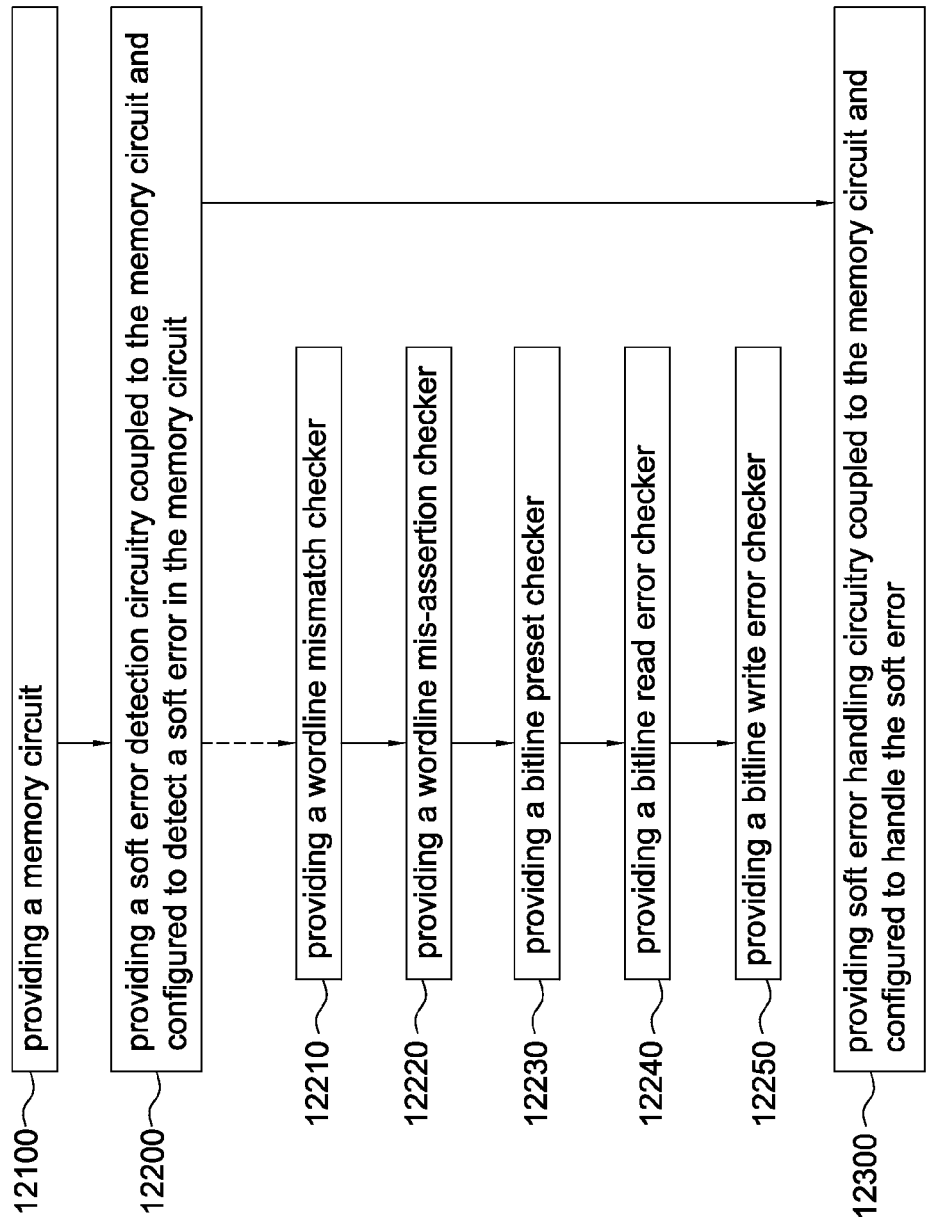
FIG. 12 shows a flowchart for an exemplary method implementing soft error detection circuitry for a memory array.

Continuing with the figures, FIG. 12 illustrates a flowchart for a method 1200 implementing soft error detection circuitry in accordance with the present disclosure.

Block 12100 of method 12000 comprises providing a memory circuit. In some examples, the memory circuit can comprise a cache memory such as described above with respect to FIGS. 1-11.

Block 12200 of method 12000 comprises providing a soft error detection circuitry coupled to the memory circuit and configured to detect a soft error in the memory circuit. In some examples, block 12200 can comprise one or more optional sub-parts, such as blocks 12210, 12220, 12230, 12240, and/or 12250 as described below.

Block 12210 can comprise in some examples providing a wordline mismatch checker configured to detect a mismatch between an encoded wordline address for a target wordline of the cache memory and a redundant wordline address for the target wordline. In some examples, providing the wordline mismatch checker can comprise providing circuitry similar and/or related to that described and illustrated above in FIG. 6 with respect to wordline mismatch checker 640.

Block 12220 can comprise in some examples providing a wordline mis-assertion checker configured to detect an erroneous assertion of at least one wordline of one or more wordlines of the cache memory. In some examples, providing the wordline mis-assertion checker can comprise providing circuitry similar and/or related to that described and illustrated above in FIG. 6 with respect to wordline mis-assertion checker 650.

Block 12230 can comprise in some examples providing a bitline preset checker configured to detect a bitline preset suppression error for one of more bitlines of the cache memory. In some examples, providing the bitline preset checker can comprise providing circuitry similar and/or related to that described and illustrated above in FIG. 7 with respect to bitline preset checker 710.

Block 12240 can comprise in some examples providing a bitline read error checker configured to detect a bitline read error for a first check bitline of the one or more bitlines of the cache memory during a read sampling window. In some examples, providing the bitline read error checker can comprise providing circuitry similar and/or related to that described and illustrated above in FIG. 8 with respect to bitline read error checker 8120.

Block 12250 can comprise in some examples providing a bitline write error checker configured to detect a bitline write error for a second check bitline of the one or more bitlines of the cache memory during a write sampling window. In some examples, providing the bitline write error checker can comprise providing circuitry similar and/or related to that described and illustrated above in FIG. 8 with respect to bitline write error checker 8620.

Block 12300 of method 12000 comprises providing a soft error handling circuitry coupled to the memory circuit and configured to handle the soft error detected in block 12200. In some examples, the soft error handling circuitry in block 12300 may handle the soft error by reloading the cache memory from a higher-level memory coupled to or forming part of the memory circuit of block 12100.

In some examples, some of the blocks of method 12000 can be subdivided into one or more different or further sub-blocks. In the same or other examples, one or more of the different blocks of method 12000 can be combined into a single block or performed simultaneously, and/or the sequence of such blocks can be changed. There can also be examples where method 12000 can comprise further or different blocks. Other variations can be implemented for method 12000 without departing from the scope of the present disclosure.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present disclosure. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosure includes any other applications in which embodiment of the above structures and fabrication methods are used. The scope of the embodiments of the present disclosure should be determined with reference to claims associated with these embodiments, along with the full scope of equivalents to which such claims are entitled.

The disclosure herein has been described with reference to specific embodiments, but various changes may be made without departing from the spirit or scope of the present disclosure. Various examples of such changes have been given in the foregoing description. Considering the different examples and embodiments described above, the disclosure herein can permit or provide for greater hardening of related circuitry against radiation-induced effects.

Accordingly, the disclosure of embodiments herein is intended to be illustrative of the scope of the application and is not intended to be limiting. It is intended that the scope of this application shall be limited only to the extent required by the appended claims. Therefore, the detailed description of the drawings, and the drawings themselves, disclose at least one preferred embodiment of the present invention, and may disclose other embodiments thereof All elements claimed in any particular claim are essential to the circuit and/or method claimed in that particular claim. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims. Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A memory device comprising:
   a memory circuit, comprising:
   one or more wordlines,
   a decoder operable to receive a wordline encoded address that corresponds to a target wordline of the one or more wordlines absent a soft error in the wordline encoded address, the decoder being configured to decode the wordline encoded address so as to actuate an actuated wordline that corresponds to the wordline encoded address, wherein the actuated wordline matches the target wordline absent the soft error in the wordline encoded address and is mismatched with the target wordline when there is the soft error in the wordline decoded address;
   an encoder coupled to the one or wordlines and configured to:
   detect the actuated wordline; and
   encode a first re-encoded address corresponding to the actuated wordline;
   soft error detection circuitry coupled to the memory circuit and configured to detect the soft error in the wordline encoded address whenever the first re-encoded address corresponds to the actuated wordline that is mismatched with the target wordline; and
   soft error handling circuitry coupled to the memory circuit and configured to handle the soft error when detected.

2. The memory device of claim 1, wherein:
   the memory circuit comprises a cache memory;
   the soft error detection circuitry is configured to detect the soft error in the wordline encoded address when caused by a Single Event Transient (SET) on the cache memory; and
   the soft error handling circuitry is configured to reload the cache memory from a higher-level memory when the soft error is detected.

3. The memory device of claim 2, wherein:
   the soft error handling circuitry is configured to reload the cache memory regardless of whether a Single Event Upset (SEU) results from the SET incident.

4. The memory device of claim 1, wherein:
the memory circuit further comprises:
   an address bus configured to carry the wordline encoded address; and
   the decoder coupled between the address bus and the one or more wordlines so that the decoder is configured to receive the wordline encoded address carried by the address bus; and
the soft error detection circuitry further comprises:
   a first re-encoded address bus; and
   the encoder coupled between the one or more wordlines and the first re-encoded address bus;
wherein:
   the encoder is configured to:
      output the first re-encoded address to the first re-encoded address bus such that, absent the soft error in the wordline encoded address, the first re-encoded address matches the wordline encoded address.

5. The memory device of claim 4, wherein:
the soft error detection circuitry further comprises:
   a first redundant address bus configured to carry a first redundant encoded address; and
   a first wordline checker comprising as inputs:
      the first re-encoded address bus; and
      the first redundant address bus;
absent the soft error, the first redundant encoded address is configured to match the wordline encoded address; and
the first wordline checker, wherein to detect the soft error in the wordline encoded address whenever the first re-encoded address corresponds to the actuated wordline that is mismatched with the target wordline, the first wordline checker is configured to detect and signal a mismatch between:
   the first redundant encoded address; and
   the first re-encoded address.

6. The memory device of claim 5, wherein:
the first wordline checker is further configured to detect and signal a soft error resulting in non-actuation of the target wordline.

7. The memory device of claim 5, wherein:
the soft error detection circuitry further comprises:
   a second re-encoded address bus; and
   a second address encoder coupled between the one or more wordlines and the second re-encoded address bus;
wherein:
   the second address encoder is configured to:
      detect the actuated wordline of the one or more wordlines;
      encode a second re-encoded address corresponding to the actuated wordline; and
      output the second re-encoded address to the second re-encoded address bus; and
absent the soft error, the second re-encoded address is a complement of the wordline encoded address.

8. The memory device of claim 7, wherein:
the soft error detection circuitry further comprises:
   a second redundant address bus configured to carry a second redundant encoded address; and
   a second wordline checker comprising as inputs:
      the second re-encoded address bus; and
      the second redundant address bus;
absent the soft error, the second redundant encoded address is configured to be a complement of the wordline encoded address; and
the second wordline checker is configured to detect and signal a mismatch between:
   the second redundant encoded address; and
   the second re-encoded address.

9. The memory device of claim 8, wherein:
the soft error comprises a wordline actuation error;
the wordline actuation error comprises:
   a concurrent actuation of more than one wordline of the one or more wordlines; and
   the first and second wordline checkers are configured to detect and signal the wordline actuation error.

10. The memory device of claim 1, wherein
the soft error detection circuitry comprises:
   a wordline mis-assertion checker coupled to the one or more wordlines and configured to detect and signal the soft error when at least one of the one or more wordlines is asserted in at least one of
      an incorrect phase of a clock signal of the memory circuit; or
      a de-selected portion of the memory circuit.

11. The memory device of claim 10, wherein:
the wordline mis-assertion checker comprises:
   an error signal node;
   a first gate configured to set the error signal node to a de-asserted condition comprising one of a charged condition or a discharged condition;
   a second gate configured to permit the error signal node to be set to an asserted condition comprising another one of the charged condition or the discharged condition;
   a controller configured to inversely actuate the first and second gates relative to each other, the controller configured to be controlled by at least one of:
      the clock signal, a reset signal, or an error acknowledge signal; and
   a first wordline switch coupled to and controlled by a first wordline of the one or more wordlines, the first wordline switch coupled between the error signal node and the second gate; and
when the first wordline switch is enabled by the first wordline while the second gate is enabled by the controller, the error signal node is set to the asserted condition to signal the soft error.

12. The memory device of claim 1, wherein:
the memory circuit comprises:
   a first memory cell;
   a first bitline coupled to the first memory cell and configured for:
      an unset condition comprising one of a discharged condition or a charged condition; and
      a preset condition comprising another one of the discharged condition or the charged condition; and
   a preset driver circuit coupled to the first bitline and configured to set the first bitline to the preset condition for a read operation;
the soft error detection circuitry comprises:
   a bitline preset checker coupled to the first bitline and configured to detect and signal the soft error as a bitline preset suppression error when the first bitline is in the unset condition immediately prior to the read operation.

13. The memory device of claim 12, wherein:
the bitline preset checker comprises:
   an error signal node;
   a first gate configured to set the error signal node to a de-asserted condition comprising one of a charged condition or a discharged condition;

a second gate configured to permit the error signal node to be set to an asserted condition comprising another one of the charged condition or the discharged condition;
a bitline sense timing control line configured to:
inversely actuate the first and second gates relative to each other; and
actuate the second gate prior to the read operation; and
a first bitline switch coupled to and controlled by the first bitline, the first bitline switch coupled between the first and second gates; and
when the first bitline switch is enabled by the first bitline while the second gate is enabled by the bitline sense timing control line, the error signal node is set to the asserted condition to signal the soft error.

14. The memory device of claim 1, wherein:
the memory circuit comprises:
a preset driver circuit configured to set one or more bitlines to a preset condition prior to a read cycle, the preset condition comprising one of a charged condition or a discharged condition; and
the soft error detection circuitry comprises:
a first check bitline controlled by the preset driver circuit;
a first check cell coupled to the first check bitline and configured to set the first check bitline to an unset condition when the first check cell is addressed, the unset condition comprising another one of the charged condition or the discharged condition; and
a bitline read error checker coupled to the first check bitline and configured to detect and signal the soft error when the first check bitline is in the preset condition during a sampling window for the read cycle.

15. The memory device of claim 14, wherein:
the soft error detection circuitry comprises a wordline configured to address the first check cell; and
the bitline read error checker is configured to signal the soft error as indicative of at least one of:
an erroneous assertion of the first check bitline by the preset driver circuit;
an untimely assertion of the first check bitline by the preset driver circuit; or
an untimely assertion of the wordline.

16. The memory device of claim 14, wherein:
the memory circuit comprises:
a preset switch coupled to the preset driver circuit and configured to set the first check bitline to the preset condition when the preset switch is enabled by the preset driver circuit; and
a wordline configured to address the first check cell for the read cycle;
the first check cell comprises a fixed value memory cell hardwired to one of a power node or a ground node to set the first check bitline to the unset condition when the first check cell is addressed by the wordline and the preset switch is disabled;
the bitline read error checker comprises:
an error signal node;
a first gate configured to set the error signal node to a de-asserted condition comprising one of a first charged condition or a first discharged condition;
a second gate configured to permit the error signal node to be set to an asserted condition comprising another one of the first charged condition or the first discharged condition;
a clocked control line coupled to a clock signal of the memory circuit and configured to:
inversely actuate the first and second gates relative to each other; and
actuate the second gate during the sampling window; and
a first bitline switch coupled to and controlled by the first check bitline, the first bitline switch coupled between the first and second gates; and
when the first bitline switch is enabled by the first check bitline while the second gate is enabled by the clocked control line, the error signal node is set to the asserted condition to signal the soft error.

17. The memory device of claim 1, wherein:
the memory circuit comprises:
a preset driver circuit comprising a preset control line configured to set one or more bitlines to a preset condition during a preset phase prior to a write cycle, the preset condition comprising one of a charged condition or a discharged condition; and
the soft error detection circuitry comprises:
a first check bitline controlled by the preset control line;
a first memory check cell comprising a first check node and coupled to:
the first check bitline; and
the preset control line;
a first data bitline coupled to the first check node of the first memory check cell; and
a bitline write error checker coupled to the first data bitline and configured to detect and signal the soft error when the first data bitline is in the preset condition during a sampling window for the write cycle.

18. The memory device of claim 17, wherein:
the bitline write error checker is configured to signal the soft error as indicative of at least one of:
an erroneous assertion of the first check bitline by the preset driver circuit; or
an untimely assertion of the first check bitline by the preset driver circuit.

19. The memory device of claim 17, wherein:
the memory circuit comprises:
a preset switch coupled to the preset control line and configured to set the first check bitline to the preset condition during the preset phase when the preset switch is enabled by the preset control line;
the preset control line is configured to:
write the first memory check cell during the preset phase to set the first check node to a first logic value correlated to a logic value of the preset control line;
the bitline write error checker comprises:
an error signal node;
a first gate configured to set the error signal node to a de-asserted condition comprising one of a first charged condition or a first discharged condition;
a second gate configured to permit the error signal node to be set to an asserted condition comprising another one of the first charged condition or the first discharged condition;
a clocked control line coupled to a clock signal of the memory circuit, the clocked control line configured to:
inversely actuate the first and second gates relative to each other; and
actuate the second gate during the sampling window; and
a first bitline switch coupled to and controlled by the first check node via the first data bitline, the first bitline switch coupled between the first and second gates; and when the first bitline switch is enabled by the first data bitline while the second gate is enabled by the clocked control line during the sampling window, the error signal node is set to the asserted condition to signal the soft error.

20. The memory device of claim 19, wherein:
the first memory check cell comprises:
   a first access switch controlled by the preset control line and coupled between the first check node and the first check bitline;
   a first write node complementary to the first check node; and
   a first write switch controlled by the preset control line and coupled between the first write node and a ground path.

21. The memory device of claim 19, wherein:
the memory circuit comprises:
   a first write enable line of one or more write enable lines, the first write enable line configured to permit one or more memory cells of the memory circuit to be written; the soft error detection circuitry further comprises:
   a first cell write circuit configured to write the first memory check cell, the first cell write circuit actuatable by the first write enable line to:
      set the first check bitline to an unset condition after the preset phase when the preset switch is disabled, the unset condition comprising another one of the charged condition or the discharged condition;
the first memory check cell comprises:
   a first access switch controlled by the preset control line to permit write access to the first memory check cell when the first write enable line enables the first cell write circuit;
wherein:
   when the first check bitline is set to the unset condition by the first cell write circuit while the first access switch is enabled by the preset control line, the first memory check cell is written by the first check bitline to set the first data bitline to the unset condition and to disable the first bitline switch of the bitline write error checker.

22. The memory device of claim 21, wherein:
the bitline write error checker is configured to signal the soft error as indicative of at least one of:
   a suppression of the first write enable line; or
   an untimely assertion of the first write enable line.

23. The memory device of claim 1, wherein:
the memory circuit comprises:
   a cache memory comprising one or more write enable lines; and
the soft error detection circuitry comprises:
   a write enable assertion detector configured to:
      detect asserted write enable lines of the one or more write enable lines; and
      indicate via a write enable check bus which of the one or more write enable lines comprise the asserted write enable lines;
   a redundant write enable bus external to the cache memory and comprising redundant write enable lines that are redundant to the one or more write enable lines; and
   a first write enable checker external to the cache memory and comprising as inputs:
      the write enable check bus; and
      the redundant write enable bus;
wherein the first write enable checker is configured to signal a write enable mismatch as the soft error when asserted ones of the redundant write enable lines mismatch with the asserted write enable lines.

24. The memory device of claim 23, wherein:
the write enable mismatch is indicative of at least one of:
   an erroneous assertion of at least one of the one or more write enable lines; or
   a suppression of at least a portion of the one or more write enable lines.

25. The memory device of claim 1, wherein:
the memory circuit comprises:
   a cache memory comprising one or more write enable lines; and
the soft error detection circuitry comprises:
   a write enable mis-assertion checker coupled to the one or more write enable lines and configured to detect and signal the soft error when at least one of the one or more write enable lines is erroneously asserted in a de-selected portion of the memory circuit.

26. The memory device of claim 25, wherein:
the write enable mis-assertion checker comprises:
   an error signal node;
   a first gate configured to set the error signal node to a de-asserted condition comprising one of a charged condition or a discharged condition;
   a second gate configured to permit the error signal node to be set to an asserted condition comprising another one of the charged condition or the discharged condition;
   a controller configured to inversely actuate the first and second gates relative to each other, the controller configured to be controlled by at least one of:
      a precharge signal, a reset signal, or an error acknowledge signal; and
   a first write enable switch coupled to and controlled by a first write enable line of the one or more write enable lines, the first write enable switch coupled between the error signal node and the second gate;
wherein:
   when the first write enable switch is enabled by the first write enable line while the second gate is enabled by the controller, the error signal node is set to the asserted condition to signal the soft error.

27. A method comprising:
providing a memory circuit comprising a cache memory and one or more wordlines of the cache memory;
providing a decoder operable to receive a wordline encoded address that corresponds to a target wordline of the one or more wordlines absent a soft error in the wordline encoded address, wherein the decoder is configured to decode the wordline encoded address so as to actuate an actuated wordline that corresponds to the wordline encoded address, wherein the actuated wordline matches the target wordline absent the soft error in the wordline encoded address and is mismatched with the target wordline when there is the soft error in the wordline decoded address;
providing an encoder coupled to the one or wordlines and configured to:
   detect the actuated wordline;
   encode a first re-encoded address corresponding to the actuated wordline:
providing soft error detection circuitry coupled to the memory circuit and configured to detect the soft error caused by a Single Event Transient (SET) in the wordline encoded address whenever the first re-encoded address corresponds to the actuated wordline that is mismatched with the target wordline; and providing soft error handling circuitry coupled to the memory circuit and configured to handle the soft error by reloading the cache memory from a higher-level memory when the soft error is detected.

wherein providing the soft error detection circuitry comprises:

configuring the soft error detection circuitry to detect a mismatch between:

an encoded wordline address of the cache memory; and a redundant wordline address for the cache memory.

28. A method comprising:

providing a memory circuit, wherein providing the memory circuit comprises:

providing a cache memory;, providing one or more wordlines of the cache memory;

providing a wordline address bus to carry a wordline encoded address that corresponds to a target wordline of the one or more wordlines absent a soft error in the wordline encoded address; and providing a redundant wordline address bus to carry a redundant encoded address, the redundant encoded address being redundant with the wordline encoded address; and providing soft error detection circuitry coupled to the memory circuit and configured to detect a soft error in the wordline encoded address, wherein providing the soft error detection circuitry comprises providing a wordline mismatch checker configured to detect a mismatch between the wordline encoded address and the redundant encoded address to detect the soft error in the wordline encoded address.

* * * * *